(12) United States Patent
Grosch et al.

(10) Patent No.: US 11,914,338 B2
(45) Date of Patent: Feb. 27, 2024

(54) REDUNDANT AUTOMATION SYSTEM AND METHOD FOR OPERATING THE REDUNDANT AUTOMATION SYSTEM

(71) Applicant: Siemens Aktiengesellschaft, Munich (DE)

(72) Inventors: Thomas Grosch, Roßtal (DE); Albert Renschler, Ettlingen (DE); Jürgen Laforsch, Buehl (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/015,000

(22) PCT Filed: May 19, 2021

(86) PCT No.: PCT/EP2021/063289
§ 371 (c)(1),
(2) Date: Jan. 6, 2023

(87) PCT Pub. No.: WO2022/008128
PCT Pub. Date: Jan. 13, 2022

(65) Prior Publication Data
US 2023/0229131 A1    Jul. 20, 2023

(30) Foreign Application Priority Data
Jul. 9, 2020  (EP) .................................. 20185017

(51) Int. Cl.
*G05B 19/042*  (2006.01)
(52) U.S. Cl.
CPC .................. *G05B 19/0428* (2013.01); *G05B 2219/24024* (2013.01)

(58) Field of Classification Search
CPC ...... G05B 19/0428; G05B 2219/24024; G05B 15/02; G05B 19/0421; G05B 9/03
See application file for complete search history.

(56) References Cited

U.S. PATENT DOCUMENTS

| | | | |
|---|---|---|---|
| 5,974,103 A * | 10/1999 | Williams | .............. H04L 5/1423 375/354 |
| 2002/0095221 A1* | 7/2002 | Cook | ....................... G05B 9/03 700/14 |

(Continued)

FOREIGN PATENT DOCUMENTS

| | | |
|---|---|---|
| EP | 2657797 | 10/2013 |
| EP | 2667269 | 11/2013 |
| EP | 2657791 B1 | 7/2019 |

OTHER PUBLICATIONS

PCT International Search Report dated Sep. 8, 2021 based on PCT/EP2021/063289 filed May 19, 2021.

*Primary Examiner* — Alicia M. Choi
(74) *Attorney, Agent, or Firm* — Cozen O'Connor (57) ABSTRACT

A method for operating a redundant automation system for controlling a technical process in which two-out-of-three system with three subsystems are operated, wherein a comparator is cyclically operated in each subsystem and compares the first, second and third output data with one another, and a respective comparator is operated such that, during each comparison in which the result is that all output data are approximately the same, no further action is performed, and during a comparison in which deviations between the output data are determined, that subsystem in which the deviations of its own output data from the other output data are the greatest is identified as faulty via a majority decision.

9 Claims, 5 Drawing Sheets

(56) References Cited

U.S. PATENT DOCUMENTS

| | | | |
|---|---|---|---|
| 2002/0152418 A1* | 10/2002 | Griffin | G06F 11/1645 714/11 |
| 2009/0076628 A1* | 3/2009 | Smith | G06F 8/656 700/3 |
| 2009/0140872 A1* | 6/2009 | O'Neal | G05B 9/03 340/679 |
| 2010/0177644 A1* | 7/2010 | Kucharczyk | H04L 41/0681 370/250 |
| 2010/0229029 A1* | 9/2010 | Frazier, II | G06F 11/2097 711/E12.001 |
| 2012/0066545 A1* | 3/2012 | Abe | G06F 11/1654 714/E11.007 |
| 2012/0096458 A1* | 4/2012 | Huang | G06F 9/5077 718/1 |
| 2013/0185726 A1* | 7/2013 | Harms | G06F 9/52 718/102 |
| 2013/0254586 A1* | 9/2013 | Winger | G06F 11/0742 714/E11.138 |
| 2013/0290776 A1* | 10/2013 | Grosch | G06F 11/2097 714/10 |
| 2013/0318041 A1 | 11/2013 | Grosch et al. | |
| 2014/0164851 A1* | 6/2014 | Pelly | G06F 11/0751 714/48 |
| 2014/0316539 A1* | 10/2014 | Bopardikar | G06F 13/102 700/20 |
| 2015/0095690 A1* | 4/2015 | Grosch | G06F 11/2097 714/4.11 |
| 2015/0095699 A1* | 4/2015 | Shirano | G06F 11/1654 714/12 |
| 2015/0134082 A1* | 5/2015 | Grosch | G05B 19/058 700/3 |
| 2016/0034363 A1* | 2/2016 | Poledna | G06F 11/2005 714/4.2 |
| 2016/0239031 A1* | 8/2016 | Koh | G05B 11/01 |
| 2017/0255191 A1* | 9/2017 | Maier | G05B 19/058 |
| 2017/0351252 A1* | 12/2017 | Kleifges | G05B 23/0289 |

\* cited by examiner

|  | A1-A2 | A1-A3 | A2-A3 |
|---|---|---|---|
| T1 → A1 | 1 | 0 | - |
| T2 → A2 | 1 | - | 1 |
| T3 → A3 | - | 0 | 1 |

FIG 7

REDUNDANT AUTOMATION SYSTEM AND METHOD FOR OPERATING THE REDUNDANT AUTOMATION SYSTEM

CROSS-REFERENCE TO RELATED APPLICATIONS

This is a U.S. national stage of application No. PCT/EP2021/063289 filed 19 May 2021. Priority is claimed on European Application No. 20185017.9 filed 9 Jul. 2020, the content of which is incorporated herein by reference in its entirety.

BACKGROUND OF THE INVENTION

1. Field of the Invention

The invention relates to a method for operating a redundant automation system for controlling a technical process, where a first subsystem, a second subsystem, a third subsystem and output device for the process are operated in a communications network such that communication paths between them are used for exchanging data, where the first subsystem with a first control program with a first program forwards first output data via a peripheral protocol to the output device in a cycle-oriented manner, where an active first application relationship is established between the first subsystem and the output means for this purpose, where parallel to the first subsystem, the second subsystem with a control program with a second program cycle calculates second output data or the third subsystem with a third control program with a third program cycle calculates third output data in readiness for the assumption of control of the technical process, where furthermore a passive second application relationship is established between the second subsystem and the output device and a passive third application relationship is established between the third subsystem and the output device, and where the three subsystems are operated such that they have knowledge of one another via their calculated output data.

2. Description of the Related Art

In automation technology, highly available solutions (H systems) are increasingly required, which are suitable for minimizing any downtimes of the plant or the process that may occur. A development of such highly available solutions is very cost-intensive, where an H system usually used in the automation environment is characterized by having two or more subsystems in the form of automation devices or computer systems coupled to one another via a synchronization connection. In principle, both subsystems can access the peripheral units connected to this H system in a read and/or write manner. One of the two subsystems is leading with regard to the periphery connected to the system. This means that outputs to peripheral units or output information or output data for these peripheral units are only performed by one of the two subsystems that also operates as a master or has assumed a master function. In order for both subsystems to be able to run synchronously, as a rule they are synchronized via synchronization connections at regular intervals. With regard to the frequency of synchronization and the scope thereof, various forms can be distinguished, such as a warm standby, or a hot standby.

An H system in automation technology requires a shock-free "failover" if one of the subsystems fails and another subsystem has to take over. This means that in the event of a malfunction, despite this switchover, this transfer from one subsystem to the other subsystem does not interfere with the technical process to be controlled or the process control. A jump (shock) of the output values at the outputs of the process due to switching is not desirable and should be avoided. Therefore, the term "shock-free" should also be understood to mean the continuity of a curve profile of the process output values.

In order to achieve this, the two subsystems must have the same system state at the time of failure. This is ensured by a suitable synchronization method.

EP 2 667 269 B1 discloses a method for operating an automation system having at least two subsystems. The automation systems are each provided with a control program. The subsystems operate with "event-synchronous processing", which means that both the master and the slave run through identical program paths of the respective control program based on an event, where the runs occurs asynchronously in time.

EP 2 657 797 B1 also discloses a similar method, where interruption points are transmitted to the slave after the occurrence of an event at a specific time.

It is known from US 2009/0076628 A1 to compare the versions of the output data in a redundant automation system with three subsystems.

With the aforementioned European published patent specifications, it is now known that so-called "1-out-of-2 systems" are used in automation technology for increasing availability. In this case, as a rule two mostly identical subsystems assume a control task and operate in a correspondingly synchronized, redundant manner. If one of the two subsystems fails, then the respective other subsystem can continue to process the control task without interrupting a production process. A diagnostic coverage (DC) is also decisive for the availability achievable with a "1-out-of-2 system". In order to obtain a high DC value, a correspondingly complex self-diagnosis functionality must be implemented in the two subsystems of a "1-out-of-2 system". This additional self-diagnosis functionality can be circumvented if a "2-out-of-3 system" is used.

SUMMARY OF THE INVENTION

Based on the foregoing, it is an object of the present invention to provide an alternative redundant automation system or method for operating an automation system.

This and other objects and advantages are achieved in accordance with the invention by a method in which a second subsystem sends a second output acknowledgement and a third subsystem sends a third output acknowledgement to the first subsystem, and a first subsystem forwards first output data to an output device only when the second output acknowledgement and the third output acknowledgement have arrived in the first subsystem, where furthermore in each subsystem a comparator is cyclically operated, which compares the first, second and third output data with one another and the respective comparator are operated such that no further action is performed in each comparison in which all the output data are the same as a result, and in a comparison in which deviations between the output data are detected, that subsystem is recognized as being faulty via a majority decision in which the deviation of its own output data from the other output data is greatest, and on based on this result, in the event that the first subsystem has been recognized as being faulty, the second application relationship is transferred from the passive state into an active state, and correspondingly the first application relationship is transferred from the active state into a passive state and from now on, the second output data is provided via the output device for the process.

For this purpose, the redundant automation system is operated such that the second and the third subsystems follow the first subsystem in time and the first subsystem implements the exchange of the data to the other subsystems asynchronously in time via the communication paths, where a first follow-up system is formed from the first subsystem and the second subsystem, a second follow-up system is formed from the first subsystem and the third subsystem, and synchronization data for the first follow-up system and the second follow-up system is identical and transmitted by the first subsystem via multicast-based communication.

With this procedure, an impact-free switchover from the first output data to the second output data is achieved. This ensures that, in the event of a switchover, the last valid or newer output data is written. The output acknowledgements for the provision of output data are accordingly sent both from the second subsystem and from the third subsystem to the first subsystem. The first subsystem only actually outputs first output data to the process when the acknowledgements from both other subsystems have arrived.

Accordingly, the two trailing subsystems synchronize asynchronously, where the first subsystem sends the synchronization data to the second subsystem and the third subsystem. This has the advantage that the synchronization data for the first follow-up system and the synchronization data for the second follow-up system are identical, and the synchronization data can thus be transmitted efficiently via multicast-based communication from the first subsystem, which in turn saves the bandwidth in the communications channels.

In a further optimized embodiment of the method, the second subsystem sends a second cycle acknowledgement, and the third subsystem sends a third cycle acknowledgement to the first subsystem, and in the first subsystem a next new first program cycle is only started when all the acknowledgements have arrived.

A transmission of all relevant information, in particular with regard to the knowledge of the subsystems that they know about each other via their calculated output data, occurs asynchronously in time. As a result, the processing power of the first subsystem is decoupled from a communication bandwidth available for event synchronization, which is particularly advantageous with regard to an increasing imbalance between an increase in the processing power of the process, on the one hand, and an increase in the communication performance of communications processes, on the other hand.

In asynchronous communication between the first subsystem and the second and third subsystem, it is regarded as a significant advantage that slow communications links can also be used to set up a highly available or redundant automation system. This means that a communications link that is poorer per se with regard to transmission bandwidth or to response time (latency) can also be provided as a communications link which is also used by other communications subscribers and thus is not exclusively available to the two subscribers for synchronization purposes.

It is also advantageous if the communication of the subsystems takes place via the communications network via Open Platform Communications United Architecture (OPC UA) or OPC UA Time Sensitive Networking (TSN).

Communication of the subsystems to the output device is advantageously configured for a Profinet network with a corresponding peripheral protocol (Profinet system redundancy).

Moreover, an outstanding advantage of the method is that at least one subsystem in an IT infrastructure is provided as a virtual subsystem in the form of a service.

It is even more advantageous if all three subsystems are configured as virtual subsystems.

The provision of a service in an IT infrastructure is referred to as "cloud computing", which generally includes the provision of storage space, computing power and/or application software as a service. In more technical terms, cloud computing describes an approach in which IT infrastructure is provided via a computer network, without the need for this infrastructure or hardware to be installed locally on site.

This proposed combination of asynchronous synchronization and a "2-out-of-3-system" architecture has the advantage that good system performance can also be achieved via networks with poor latency.

It is considered an advantage that, for example, a third subsystem or a third PLC/SPS can be instantiated cost-effectively in a cloud environment. This makes it possible to implement high-performance, cloud-based automation solutions which offer availability adequate for the automation environment.

A further advantage of the solution described here is that it is possible to change from a "1-out-of-2" to a "2-out-of-3" solution during operation in order to increase reliability for critical process steps.

A further method step provides that, in the event that from now on the second subsystem forwards the output data to the output device via the active second application relationship, the third subsystem now sends the third output acknowledgement and the third cycle acknowledgement to the second subsystem, and the second subsystem forwards the second output data to the output device only when the third output acknowledgement and the third cycle acknowledgement have arrived at the second subsystem.

It is also an object of the invention to provide a redundant automation system for controlling a technical process, where the redundant automation system comprises a first subsystem, a second subsystem, a third subsystem and output device which are connected via a communications network, where the first subsystem is configured to output first output data to the output device in a cycle-oriented manner using a first control program with a first program cycle via an active first application relationship, the second subsystem is configured with a second control program with a second program cycle, in readiness to provide second output data for the output device via a second application relationship, where the third subsystem is configured with a third control program with a third program cycle, in readiness to provide third output data for the output device via a third application relationship, and where the three subsystems are furthermore configured to provide their calculated output data to one another.

The aforementioned object of providing an improved automation system in relation to those already known hitherto is achieved in that the second subsystem has a second acknowledgement output device that is configured to send a second output acknowledgement, and the third subsystem has a third acknowledgement output device that is configured to send a third output acknowledgement, and the first subsystem has a release mechanism that is configured to forward the first output data to the output device only when the second output acknowledgement and the third output acknowledgement have arrived in the first subsystem, and furthermore each subsystem has a comparator that is configured to cyclically compare the first, second and third items of output data with one another and, in the event of a comparison in which the result is that all output data is the same, no further action is performed, and in the event of a comparison in which deviations between the output data are determined, the subsystem, in which the deviations of its own output data from the other output data are greatest, is recognized as being faulty via a majority decision, where a deviation detector is present for this purpose. The first subsystem is furthermore configured, in the event that the first subsystem was recognized as being faulty, to transfer the first application relationship from the active state into a passive state and the second subsystem is configured to transfer the second application relationship from the passive state into an active state, whereby from now on the second output data is provided via the output means for the process.

In a further advantageous embodiment of the redundant automation system, a first follow-up system is formed from the first subsystem and the second subsystem, and a second follow-up system is formed from the first subsystem and the third subsystem, where the first subsystem is configured such that it provides synchronization data for the first follow-up system and the second follow-up system via multicast-based communication.

In a further embodiment of redundant automation system, the second acknowledgement output device is also configured to send a second cycle acknowledgement to the first subsystem, the third acknowledgement output device is configured to send a third cycle acknowledgement to the first subsystem and the first subsystem is configured to start a new first program cycle only when all the acknowledgements have arrived.

It is particularly advantageous to arrange at least one subsystem in an IT infrastructure as a virtual subsystem in the form of a service. As the possibility of transferring control applications to a cloud has increasingly been discussed in the recent past, a solution for a redundant automation system is also presented here. In particular, a cloud is an infrastructure that is made available, for example, via the internet and that usually provides storage space, computing power and/or application software without a corresponding infrastructure having to be installed and stored on a local computer. In the case of a cloud, the hardware is generally not operated or provided by the user of an application or the application itself.

In particular, a cloud or cloud computing can be understood to mean the provision of IT infrastructure as a service, possibly from a remote site. A cloud can be accessible via the internet or can also be operated by a company as a so-called private cloud in which the IT infrastructure is accessible via a network, for example an intranet of the company.

With the disclosed embodiments of the invention, it is therefore possible to transfer at least one subsystem to a cloud.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, in which.

DETAILED DESCRIPTION OF THE EXEMPLARY EMBODIMENTS

Figure 1:
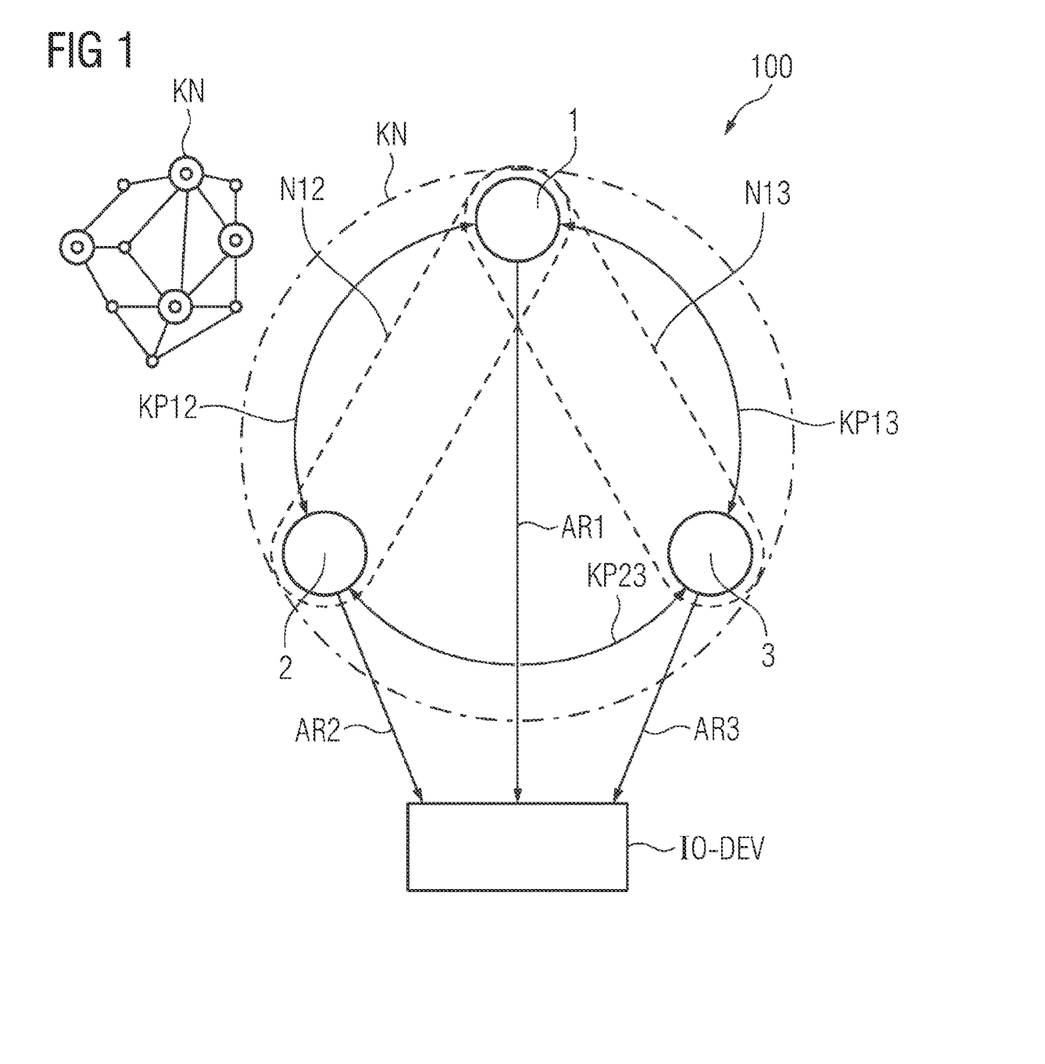
FIG. 1 shows a redundant automation system, formed in a 2-out-of-3 configuration in accordance with the invention.

FIG. 1 shows a redundant automation system 100 for controlling a technical process. The redundant automation system 100 comprises a first subsystem 1, a second subsystem 2, a third subsystem 3 and an output device IO-Dev. The aforementioned subsystems 1, 2, 3 and the output device IO-Dev are connected via a communications network KN, where a symbolized communications network is shown again laterally in a structure as is customary today, such as for the internet. With the aid of this communications network KN, communication paths KP12, KP13, KP23 can be spanned between the subsystems 1, 2, 3. Accordingly, a first communication path KP12 exists between the first subsystem 1 and the second subsystem 2, a second communication path KP13 exists between the first subsystem 2 and the third subsystem 3, and a third communication path KP23 exists between the second subsystem 2 and the third subsystem 3.

The first subsystem 1 is formed as a master and accordingly the first subsystem 1 can output first output data A1 with a first control program P1 with a first program cycle Z1 in a cycle-oriented manner via an active first application relationship AR1 to the output device IO-Dev.

The second subsystem 2 is provided with a second control program P2 with a second program cycle Z2 and is in readiness, namely in a slave function, to provide second output data A2 for the output device IO-Dev via a second application relationship AR2.

The third subsystem 3 is provided with a third control program P3 with a third program cycle Z3 and is likewise in readiness to provide third output data A3 for the output means IO-Dev via a third application relationship AR3, where the three subsystems 1, 2, 3 are furthermore configured to provide their calculated output data A1, A2, A3 to one another via the communication paths KP12, KP13, KP23.

The second and the third subsystem 2, 3 follow the first subsystem 1 in time and the first subsystem 1 exchanges the required data asynchronously in time via the communication paths KP12, KP13, where a first follow-up system N12 is formed from the first subsystem 1 and the second subsystem 2 and a second follow-up system N13 are formed from the first subsystem 1 and the third subsystem 3, and where the necessary synchronization data for the first follow-up system N12 and the second follow-up system N13 are identical and therefore advantageously have to be transmitted only once via a multicast-based communication from the first subsystem 1 to the other subsystems 2, 3.

The embodiment of the subsystems 1, 2, 3 will be discussed in more detail with reference to FIG. 2. The first subsystem 1 has a first acknowledgement output device QAM1; via this acknowledgement output device QAM1, the first control program P1 with its first program cycle Z1 can provide acknowledgements for other subsystems 2, 3 if, for example, the first program cycle Z1 has been completed or the first output data A1 is fully available. The first control program P1 writes the first output data A1 into a first process image PA1, from which first process image PA1 it can be sent to an output means IO-Dev via a first application relationship AR1.

However, as in the now prevailing configuration of the redundant automation system 100, the first subsystem 1 has the leading control role for the technical process, and the second subsystem 2 and the third subsystem 3 each send their second output acknowledgement AQ2 or their third output acknowledgement AQ3 to the first subsystem 1 via the second acknowledgement output device QAM2 or the third acknowledgement output device QAM3.

Figure 6:
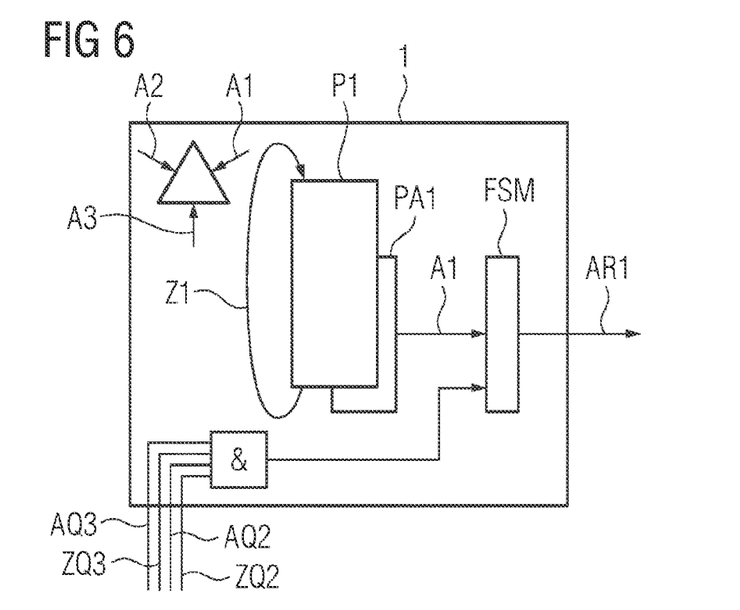
FIG. 6 shows a detailed illustration of a subsystem explaining release mechanism in accordance with the invention.

As shown in FIG. 6, the first subsystem 1 has a release mechanism FSM that is configured to forward the first output data A1 to the output device IO-Dev only when the second output acknowledgement AQ2 and the third output acknowledgement AQ3 have arrived in the first subsystem 1.

Figure 2:
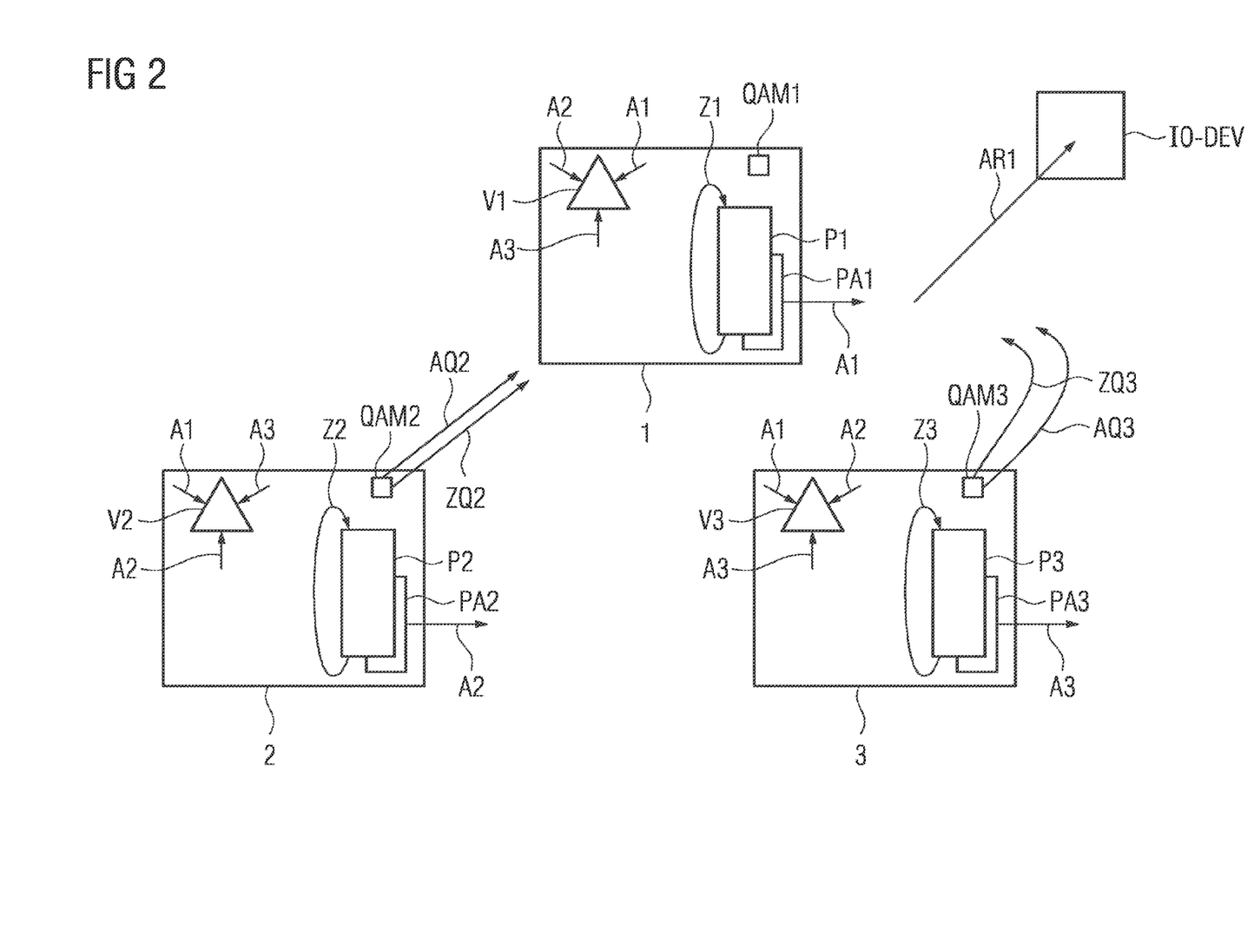
FIG. 2 shows the automation system of FIG. 1 in a detailed illustration with regard to the subsystems.

In order to detect a possible malfunction, each subsystem 1, 2, 3 according to FIG. 2 has a comparator V1, V2, V3, which is configured to cyclically compare the first, second and third output data A1, A2, A3 with one another and, in the event of a comparison in which all output data A1, A2, A3 are the same as a result, no further action is performed.

However, in the event of a comparison in which deviations between the output data A1, A2, A3 are determined, the subsystem 1, 2, 3, in which the deviation of its own output data A1, A2, A3 from the other output data A1, A2, A3 is greatest, is recognized as being faulty via a majority decision ME.

Figure 3:
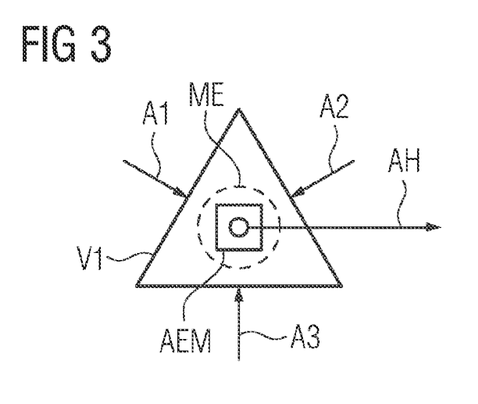
FIG. 3 shows the principle of comparator in accordance with the invention.

For this purpose, there is a deviation detector AEM, as shown in FIG. 3. In the first comparator V1, the deviation detector AEM is arranged which, via a majority decision ME, provides a deviation frequency AH with regard to a subsystem 1, 2, 3.

Figure 4:
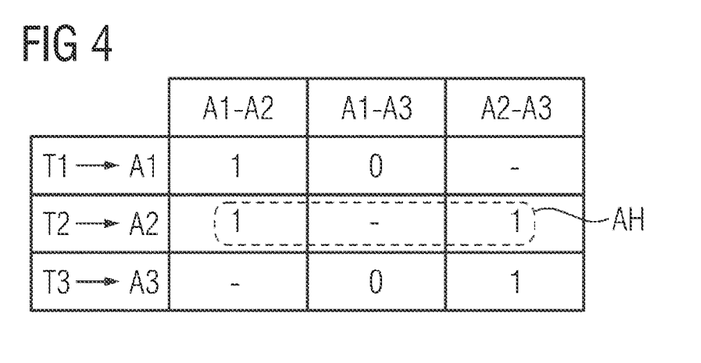
FIG. 4 shows a table for illustrating the determination of a deviation frequency for a particular subsystem in accordance with the invention.

FIG. 4 is intended to illustrate in a table how the majority decision ME is determined via a deviation frequency AH. The first column shows the subsystems 1, 2, 3 as they produce their output data A1, A2, A3. For the sake of simplicity, the second column is intended to represent standardized output data A1, A2, A3 in terms of their valence. From the third column onwards, the difference between the output data A1, A2, A3 is now represented in terms of absolute value. Accordingly, the difference between the first output data A1 and A2, the difference between the first output data A1 and the third output data A3 and the difference between the second output data A2 and the third output data A3 are represented in terms of absolute value. In the first line T1, the deviation is 1, 0,- because there is no deviation between the second output data A2 and the third output data A3, based on the first output data A1.

The second line T2 shows the deviation 1, -, 1. The third line shows the deviation -, 0, 1. This results in a deviation frequency AH in the second line for the second subsystem 2, since a deviation from 1 exists twice, which in total yields the valence 2. Thus, based on the majority decision ME, it is determined that the second subsystem 2 must be regarded as faulty. Program scenarios would now occur in order to switch off the faulty subsystem, although the first subsystem 1 still has master functionality, the second subsystem 2 is switched off such that it cannot function as a redundant subsystem in the event of failure of the first subsystem 1, now only the third subsystem 3 could function as a redundant subsystem to the failed first subsystem 1.

In the event that the first subsystem 1 is considered to be faulty, the deviation frequency AH would be found in the first line T1 of the first subsystem 1.

Figure 5:
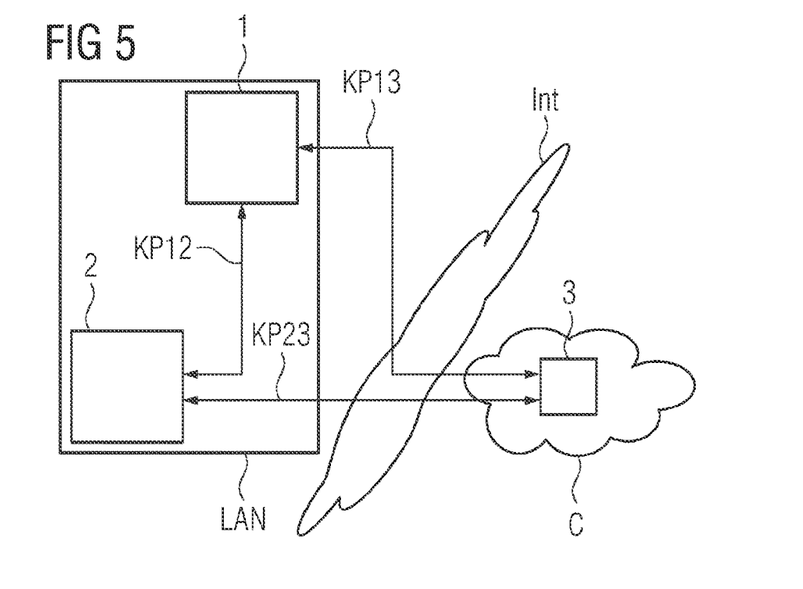
FIG. 5 shows a block diagram, where a subsystem is arranged in a cloud.

FIG. 5 shows the possibility of arranging at least one subsystem 1, 2, 3, namely the third subsystem 3, in an IT infrastructure as a virtual subsystem in the form of a service. The IT infrastructure therefore corresponds to a cloud C. Via an internet Int, the communication paths KP13 or KP23 to the other subsystems 1, 2 can still be set up. However, the first subsystem 1 and the second subsystem 2 are located in a Local Area Network LAN such as exists, for example, on a production site of an industrial automation plant, which is advantageous because a redundant automation system 100 is set up here, in which a third physical subsystem 3 does not necessarily have to be placed on the production site, but rather is implemented as a backup solution in a cloud C, which offers a cost advantage and accordingly the third subsystem 3 would not differ from the second subsystem 2.

According to FIG. 6, the release mechanism FSM is shown again with regard to the acknowledgements. For example, in the first subsystem 1, the second output acknowledgement AQ2, the third output acknowledgement AQ3, the second cycle acknowledgement ZQ2 and the third cycle acknowledgement ZQ3 are interconnected via an AND operation and forwarded to the release mechanism FSM as a validity signal, the first output data A1 provided by the first process image PA1 of the first subsystem 1 can thus be sent to the output device IO-Dev via the first application relationship AR1, such as via a Profinet.

Figure 7:
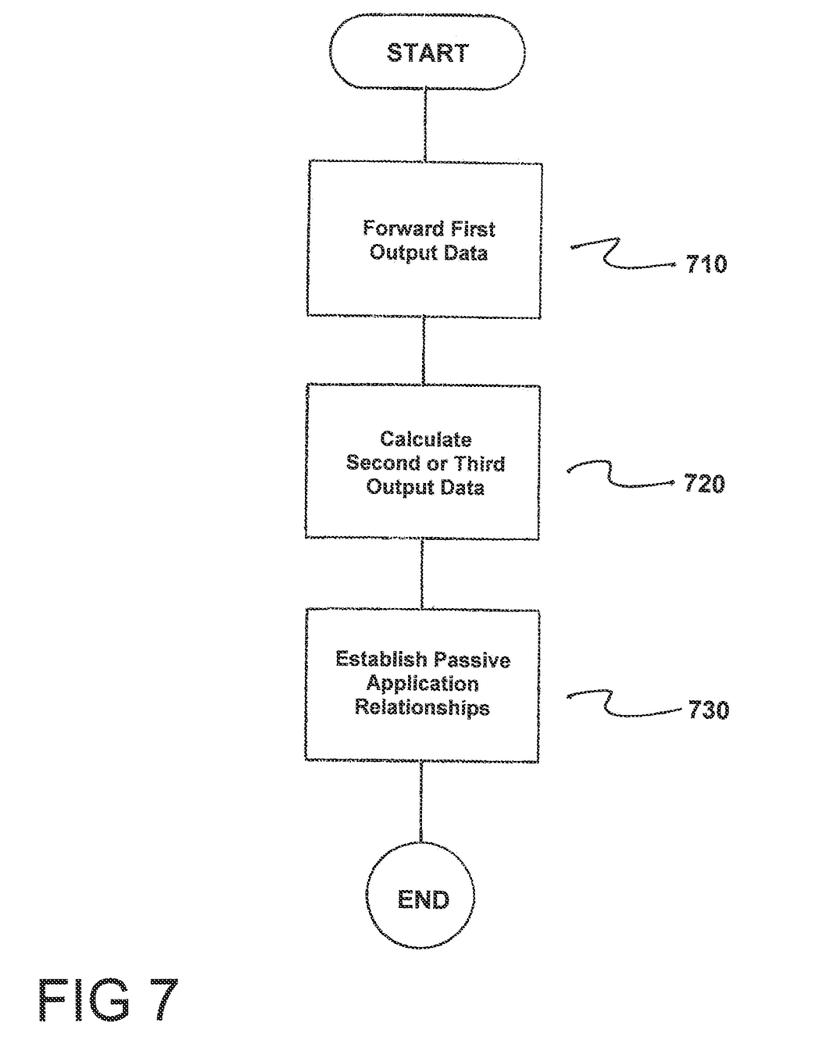
FIG. 7 is a flowchart of the method in accordance with the invention.

FIG. 7 is a flowchart of the method for operating a redundant automation system 100 for controlling a technical process, where a first subsystem 1, a second subsystem 2, a third subsystem 3 and an output device IO-Dev for the process are operated in a communications network KN such that communication paths KP12, KP13, KP23 between them are utilized to exchange data.

The method comprises forwarding, by the first subsystem 1 with a first control program P1 with a first program cycle Z1, first output data A1 to the output device IO-Dev in a cycle-oriented manner via a peripheral protocol PN, as indicated in step 710. Here, an active first application relationship AR1 is established between the first subsystem 1 and the output device IO-Dev for this purpose.

Next, in parallel to the first subsystem 1, by either (i) the second subsystem 2 with a second control program P2 with a second program cycle Z2 second output data A2 or (ii) the third subsystem 3 with a third control program P3 with a third program cycle Z3 third output data A3 is calculated in readiness for the assumption of control of the technical process, as indicated in step 720.

Next, a passive second application relationship AR2 is established between the second subsystem 2 and the output device IO-Dev and a passive third application relationship AR3 is established between the third subsystem 3 and the output device (IO-Dev), as indicated in step 730.

In accordance with the method, the first, second and third subsystems 1, 2, 3 are operated such that the first, second and third subsystems 1, 2, 3 have knowledge of one another via respective calculated output data A1, A2, A3.

In accordance with the method, the second subsystem 2 sends a second output acknowledgement AQ2, and the third subsystem 3 sends a third output acknowledgement AQ3 to the first subsystem 1.

Furthermore, the first subsystem 1 forwards the first output data A1 to the output device IO-Dev only when the second output acknowledgement AQ2 and third output acknowledgement AQ3 have arrived in the first subsystem 1.

In accordance with the method, moreover, in each subsystem of the first, second and third subsystems 1, 2, 3, a comparator V1, V2, V3 is cyclically operated, which compares the first, second and third output data A1, A2, A3 with one another and a respective comparator V1, V2, V3 are operated such that no further action is performed for each comparison in which all output data A1, A2, A3 are the same as a result.

In accordance with the method, in a comparison in which deviations between items of output data are established, that subsystem of the first, second and third subsystems 1, 2, 3 is recognized as being faulty via a majority decision ME in which deviations of its own output data A1, A2, A3 from other output data A1, A2, A3 are greatest, and on the basis of this result.

In accordance with the method, in an event that the first subsystem 1 has been identified as being faulty, the second application relationship AR2 is transferred from the passive state into an active state and the first application relationship AR1 is correspondingly transferred from the active state into a passive state, and from then on the second output data A2 is provided for the process via the output device IO-Device.

In accordance with the method, the second and the third subsystems 2, 3 follow the first subsystem 1 in time and the first subsystem 1 implements exchanges of data via the communication paths KP12, KP13 asynchronously in time.

In accordance with the method, a first follow-up system N12 is formed from the first subsystem 1 and the second subsystem 2 and a second follow-up system N13 is formed from the first subsystem 1 and the third subsystem 3.

In accordance with the method, synchronization data for the first follow-up system N12 and the second follow-up system N13 is identical and is transmitted by the first subsystem 1 via multicast-based communication.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a redundant automation system for controlling a technical process, a first subsystem, a second subsystem, a third subsystem and an output device for the process being operated in a communications network such that communication paths between them are utilized to exchange data, the method comprising:

forwarding, by the first subsystem with a first control program with a first program cycle, first output data to the output device in a cycle-oriented manner via a peripheral protocol, an active first application relationship being established as an active first application state between the first subsystem and the output device;

calculating, in parallel to the first subsystem, by one of (i) the second subsystem with a second control program with a second program cycle output data and (ii) the third subsystem with a third control program with a third program cycle third output data in readiness for assuming control of the technical process; and establishing a passive second application relationship as a second application state between the second subsystem and the output device and establishing a passive third application relationship as a third application state between the third subsystem and the output device;

wherein the first, second and third subsystems are operated such that the first, second and third subsystems have knowledge of one another via respective calculated output data;

wherein the second subsystem sends a second output acknowledgement, and the third subsystem sends a third output acknowledgement to the first subsystem;

wherein the first subsystem forwards the first output data to the output device only when the second output acknowledgement and third output acknowledgement have arrived in the first subsystem;

wherein in each subsystem of the first, second and third subsystems a comparator is cyclically operated, which compares the first, second and third output data with one another, and the comparator of each subsystem is operated so that no further action is performed for each comparison in which all output data are the same as a result;

wherein in a comparison in which deviations between the first, second, and third output data are established, that subsystem of one of the first, second and third subsystems is recognized as being faulty via a majority decision in which deviations of its own output data from other output data are greatest;

wherein in an event that the first subsystem has been identified as being faulty, the second application relationship is transferred from the passive second application state into an active second application state and the first application relationship is correspondingly transferred from the active first application state into a passive first application state, and from then on, the second output data is provided for the technical process via the output device;

wherein the second and the third subsystems follow the first subsystem in time and the first subsystem implements exchanges of data via the communication paths asynchronously in time;

wherein a first follow-up system is formed from the first subsystem and the second subsystem and a second follow-up system is formed from the first subsystem and the third subsystem; and wherein synchronization data for the first follow-up system and the second follow-up system is identical and is transmitted by the first subsystem via multicast-based communication.

2. The method as claimed in claim 1, wherein the second subsystem sends a second cycle acknowledgement and the third subsystem sends a third cycle acknowledgement to the first subsystem, and a next new first program cycle is started in the first subsystem only when all acknowledgements have arrived.

3. The method as claimed in claim 2, wherein the communication of the first, second and third subsystems occurs via the communications network in accordance with Open Platform Communications United Architecture or OPC UA Time Sensitive Networking.

4. The method as claimed in claim 2, wherein the communication of the first, second and third subsystems to the output device for a Profinet network is configured with a corresponding peripheral protocol.

5. The method as claimed in claim 1, wherein the communication of the first, second and third subsystems occurs via the communications network in accordance with Open Platform Communications United Architecture or OPC UA Time Sensitive Networking.

6. The method as claimed in claim 5, wherein the communication of the first, second and third subsystems to the output device for a Profinet network is configured with a corresponding peripheral protocol.

7. The method as claimed in claim 1, wherein the communication of the first, second and third subsystems to the output device for a Profinet network is configured with a corresponding peripheral protocol.

8. The method as claimed in claim 1, wherein at least one subsystem of the first, second and third subsystems is provided in an information technology (IT) infrastructure as a virtual subsystem formed as a service.

9. The method as claimed in claim 1, wherein in an event that the second subsystem forwards the output data via the active second application relationship to the output device, the third subsystem now sends the third output acknowledgement and the third cycle acknowledgement to the second subsystem and the second subsystem transmits the second output data to the output device only when the third output acknowledgement and the third cycle acknowledgement have arrived at the second subsystem.

\* \* \* \* \*